(12) United States Patent
Huang et al.

(10) Patent No.: US 11,068,253 B2
(45) Date of Patent: Jul. 20, 2021

(54) SOFTWARE UPGRADE AND DOWNGRADE USING GHOST ENTRIES

(71) Applicant: HEWLETT PACKARD ENTERPRISE DEVELOPMENT LP, Houston, TX (US)

(72) Inventors: Freeman Yufei Huang, Roseville, CA (US); Matthew Lee Deter, Rocklin, CA (US); Jorge Arturo Villavicencio Conejo, Roseville, CA (US); Hari Babu Ravindran, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 31 days.

(21) Appl. No.: 16/663,477

(22) Filed: Oct. 25, 2019

(65) Prior Publication Data
US 2021/0124568 A1 Apr. 29, 2021

(51) Int. Cl.
*G06F 9/44* (2018.01)
*G06F 8/65* (2018.01)

(52) U.S. Cl.
CPC ................................. *G06F 8/65* (2013.01)

(58) Field of Classification Search
CPC .............................................. G06F 8/65
USPC ................................. 717/168–178
See application file for complete search history.

(56) References Cited

U.S. PATENT DOCUMENTS

| 7,603,669 B2* | 10/2009 | Curtis | G06F 8/65 |
| | | | 717/174 |
| 8,806,471 B2* | 8/2014 | Vidal | G06F 8/65 |
| | | | 717/170 |
| 9,170,827 B2 | 10/2015 | Yufei et al. | |
| 9,411,576 B2* | 8/2016 | Hocker | G06F 8/71 |
| 2003/0005426 A1 | 1/2003 | Scholtens et al. | |
| 2004/0249760 A1* | 12/2004 | Garibay | H04L 63/20 |
| | | | 705/59 |
| 2010/0306757 A1 | 12/2010 | Becker et al. | |
| 2012/0222025 A1 | 8/2012 | Rakesh | |
| 2014/0298007 A1 | 10/2014 | Rukmangathan et al. | |
| 2015/0317148 A1* | 11/2015 | Ohashi | G06F 8/65 |
| | | | 717/170 |
| 2016/0330219 A1* | 11/2016 | Hasan | G06N 5/025 |

OTHER PUBLICATIONS

Cadar et al., "Multi-version software updates", 2012, IEEE, pp. 36-40. (Year: 2012).*

(Continued)

*Primary Examiner* — Ted T. Vo
(74) *Attorney, Agent, or Firm* — Nolte Lackenbach Siegel (57) ABSTRACT

Methods and systems for modifying software programs are disclosed. For instance, an example method for modifying a software program may include extracting, from a configuration program file, a future list of one or more future active entries relating to a future version of the software program and a future list of one or more future ghost entries relating to the future version of the software program, comparing the future lists of future active and ghost entries to current lists of current active entries and current ghost entries of a current version of the software program. Then, at least one upgrade or at least one downgrade of the current version of the software program is performed in response the comparison of the current and future lists.

20 Claims, 9 Drawing Sheets

(56) References Cited

OTHER PUBLICATIONS

Kumar et al., "An Approach to Implement Cryptographic Protocol Version Downgrade Within a Secure Internal Network: TLS 1.x to SSL", 2019, International Journal of Interactive Mobile Technologies, vol. 13, No. 10, pp. 179-187. (Year: 2019).*
Configuration Conversion Wizard (CCW), (Research Paper), Retrieved Feb. 28, 2019, 6 Pgs.
Ponomarenko, A. et al., Automatic Backward Compatibility Analysis of Software Component Binary Interfaces, (Research Paper), 2011 IEEE International Conference on Computer Science and Automation Engineering, Jun. 10, 2011, 2 Pgs.
JSON Patch, "What is JSON Patch?", available online at <https://web.archive.org/web/20190501233133/http://sonpatch.com/>, May 1, 2019, 6 pages.
Paul C. Bryan, "JavaScript Object Notation (JSON) Patch", Request for Comments: 6902, Apr. 2013, pp. 1-18.

* cited by examiner

| VER 1.0 510 | |
|---|---|
| ACTIVE 512 | GHOST 514 |
| ID1<br>ID2 | |

| VER 2.0 520 | |
|---|---|
| ACTIVE 522 | GHOST 524 |
| ID1<br>ID2<br>ID3<br>ID4 | |

| VER 3.0 530 | |
|---|---|
| ACTIVE 532 | GHOST 534 |
| ID1<br>ID2<br>ID3<br>ID4<br>ID5<br>ID6 | |

| VER 4.0 540 | |
|---|---|
| ACTIVE 542 | GHOST 544 |
| ID5<br>ID6<br>ID7<br>ID8 | ID1<br>ID2<br>ID3<br>ID4 |

| VER 5.0 550 | |
|---|---|
| ACTIVE 552 | GHOST 554 |
| ID5<br>ID6<br>ID7<br>ID8<br>ID9<br>ID10 | ID1<br>ID2<br>ID3<br>ID4 |

SOFTWARE UPGRADE AND DOWNGRADE USING GHOST ENTRIES

BACKGROUND

As new versions of a particular software program are developed and released, each new version of the software program may be configured to search for configuration entries that are different from a previous version. For example, an older version of a software program may have been configured to search for an entry containing the variable "DATABASE," while a newer version of the software program may be configured to search for the entry containing the variable "DATABASE_LOCATION" instead of the variable "DATABASE." Thus, a configuration program containing the older variable may be deemed incompatible with the new version of the program. Configuration programs may include a version number associated with a particular release of a software program to indicate the version with which the configuration program file is compatible.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The methods and systems disclosed below may be described generally, as well as described in terms of specific examples. For instances where references are made to detailed examples, it is noted that any of the underlying principles described are not to be limited to a single example but may be expanded for use with any of the other methods and systems described herein as will be understood by one of ordinary skill in the art unless otherwise specifically stated.

For the purposes of this disclosure the term "software upgrade" refers to replacing a software program with a newer version of the software program. Such newer versions generally offer changes or improvements over older versions.

In contrast, the term "software downgrade" refers to the process of causing a software program that has been upgraded to a newer version to revert to an older version. It is to be appreciated, however, that for business reasons a "downgrade" may cause a software program to revert to a different older software version than where a particular upgrade originated. For example, a downgrade may cause a software program to revert to an older version on a different software development branch that has a feature not available on the current software branch or omits a feature currently available on the current software branch. It is also to be appreciated that an older version may include more features than a current version, rather than less features. Software downgrades are sometimes performed to address compatibility issues or other problems inadvertently caused by the upgrade. For example, a newer version of a graphics-related software program may embed new codes into a particular graphics file that is incompatible with older graphics engines produced by a particular vendor and relied upon by legacy hardware terminals.

The process of performing software upgrades and downgrades is desirable for practically every software program on the market. Further, updating practically any software program from one version to another can be relatively simple when updates are frequent, e.g., when updating a hypothetical software product from version 1.3 to version 1.4. However, when updating occurs infrequently, e.g., from version 3.5 to version 5.7, every intervening update is taken into account. This can be both time consuming and impractical as every updated version of a software program is compared to a previous version before the update process may begin.

Both software program upgrades and downgrades involve what are known as "conversion entries." Conversion entries carry all the necessary conversion programs in forms of executables, scripts, etc. used to perform each software upgrade or downgrade for a particular software feature or group of features, e.g., supporting read and write functions for an outdated floppy disk drive. Unfortunately, these conversion programs accumulate over time and can become very significant in size, which is a substantial waste when a conversion program is no longer supported by the latest software upgrade.

To address this problem, the present disclosure introduces the concept of "ghost" conversion entries, which are special entries designed to ignore or completely remove individual conversion programs or even whole families of conversion programs from the software upgrade process. The use of ghost entries enables software-based systems to identify and handle software configurations (i.e., features) that are no longer supported by a software product, and thus avoid useless processing that can possibly lead to software corruption and system malfunction. "Ghost" entries effectively kill the process of accumulating unused configuration conversion programs infinitely, which leads to the simplification and increased reliability of the software upgrade and downgrade process.

For the purposes of this disclosure, the concept of a "conversion entry" is divided into two parts including a "configuration program," which contains any number of instructions in the form of scripts, executable files, pointers to scripts or executable files, or any other type of information that may be used to provide instructions usable to implement a software program upgrade or downgrade. The second part of a conversion entry is referred to as an "identification entry," which may be any form of identifier (e.g., literal name, pointer, etc.) capable of referring to a respective configuration program. As is discussed below individual configuration entries may be divided to various types and placed into respective lists of identification entries. A particular advantage of the disclosed approach is finer granularity. That is, the upgrade/downgrade execution is not determined by the software versions; it is determined entry by entry, by whether a particular configuration and/or ghost entry is present in a configuration program file or not.

Figure 1:
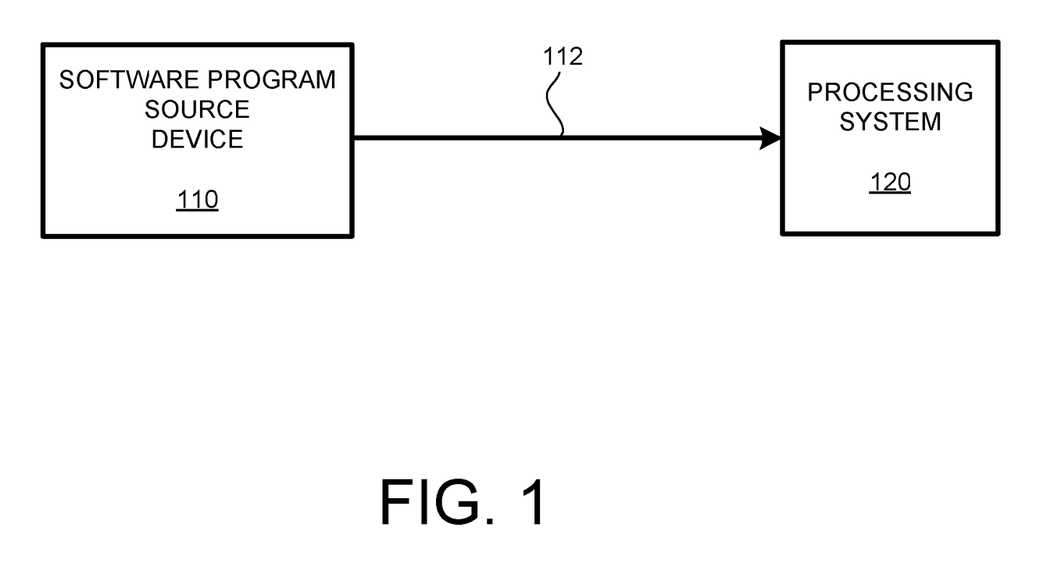
FIG. 1 depicts a relationship between a processing system capable of upgrading software and a software program source device in accordance with one or more examples of the present disclosure.

Turning to FIG. 1, a relationship between a processing system 120 capable of performing software upgrades and downgrades and a software program source device 110 in accordance with one or more examples of the present disclosure is depicted. As shown in FIG. 1, the example processing system 120 is communicatively coupled to the example software program source device 110 by a communication link 112.

The example software program source device 110 is, in this particular example, a developer terminal usable by one or more software engineers to develop and debug software so as to provide a series of software program upgrade files usable by the processing system 120 to upgrade and possibly downgrade a software program, and can take the form of a stand-alone computer-based system. However, in other examples the software program source device 110 can be any of, or a combination of, multiple servers, stand-alone-computers, mainframe computers, or any other suitable device or system usable by a user to provide software upgrade files.

The example processing system 120 is, in this particular example, a stand-alone computer-based system, such as a personal computer. However, similar to the software program source device 110, the processing system 120 can be any of, or a combination of, multiple servers, stand-alone-computers, mainframe computers, or any other suitable device or system usable by a user to upgrade software programs.

The example communication link 112 is a series of networked communication links constituting an internet-based connection. However, in various embodiments it is to be appreciated that the example communication link 112 may be any form of, or combination of, networked or point-to-point communication devices/systems capable of transferring information between the example software program source device 110 and the example processing system 120. For instance, by way of non-limiting examples the communication link 112 may take the form of an Ethernet network, Token Ring network, an Arcnet system, a modem connection, a cellular connection and/or an 802.11-based connection. In still other examples, the example communication link 112 may include or take a manual form. For instance, the example communication link 112 may involve a human transporting some portable media, such as a magnetic disk, an optical disc, or a jump drive, and copying the content of the portable media into the processing system 120.

In operation, the example software program source device 110 may transmit any number of software upgrade files to the processing system 120 via communication link 112. In response, the processing system 120 may receive the software upgrade files, and subsequently perform software upgrades on software programs which the software upgrade files were designed to alter.

In addition to performing software upgrades, the processing system 120 may also perform software downgrades using the various software upgrade files. For instance, a user using version 5.0 of a particular software program may wish to downgrade to version 4.0 of the particular software program to address compatibility issues with other software programs that do not support version 5.0 of the particular software program.

Figure 2:
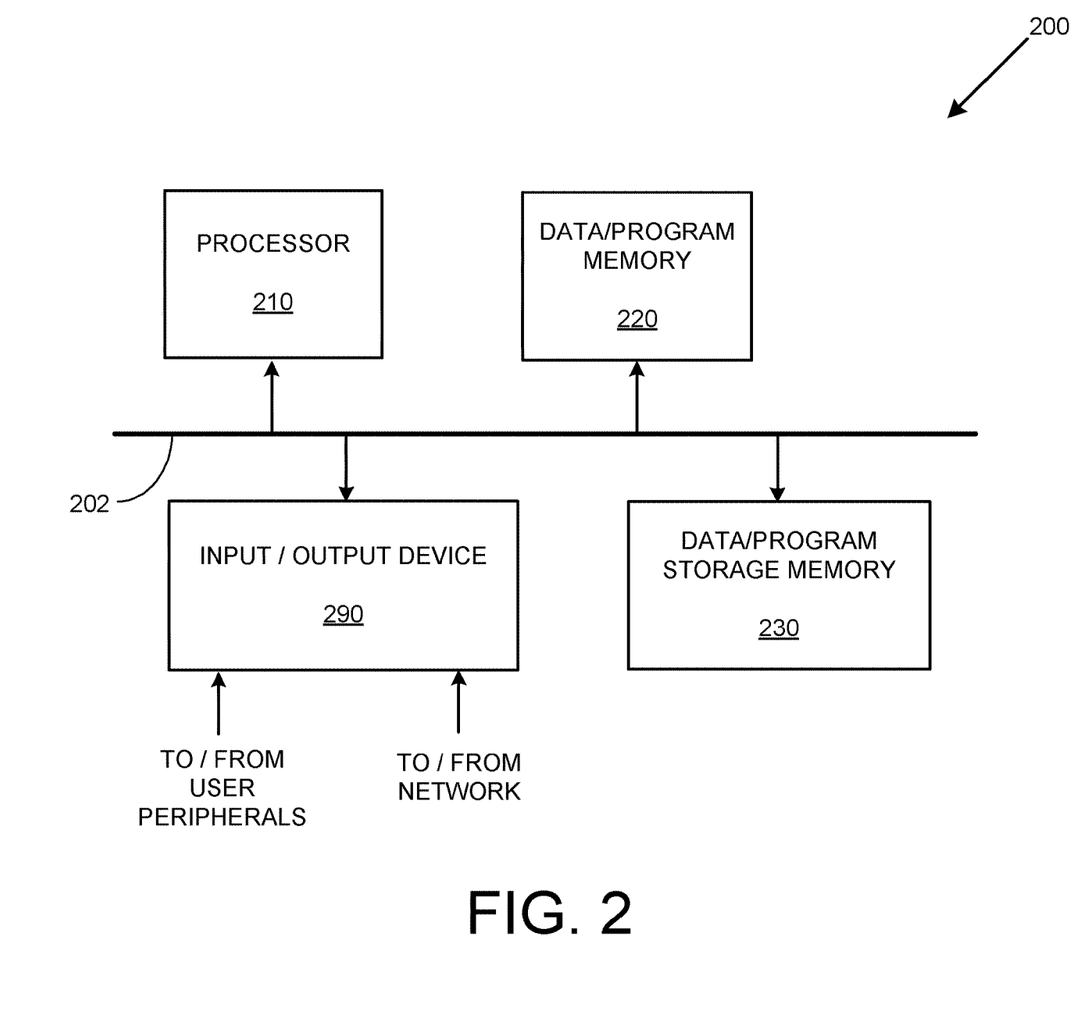
FIG. 2 depicts an example processing system capable of performing software upgrades and downgrades in accordance with one or more examples of the present disclosure.

FIG. 2 depicts an example processing system 200 capable of performing software upgrades and downgrades in accordance with one or more examples of the present disclosure. As shown in FIG. 2, the example processing system 200 includes a processor 210 (e.g., a central processing unit, or "CPU", a microprocessor, a processor chipset, or a controller), a data/program memory 220, a data/program storage memory 230, and an input/output device 290. The above electronic components 210, 220, 230, and 290 are communicatively coupled together by a control/data bus 202.

The example memory 220 can be any type of machine-readable device, such as volatile and non-volatile random-access memories. Similarly, the data/program storage memory 240 may be any form of machine-readable device suitable for storing data, such as an optical storage disc, a magnetic storage device, and so on. The example input/output device 290 is a combination of serial and parallel interfaces suitable to allow the processing system 200 to interact with a number of external devices, such as a remote computer terminal and/or computer-based equipment, a communication network, and so on. For instance, by way of non-limiting examples the input/output device 290 may take the form of an Ethernet device, a Token Ring device, an Arcnet device, a modem, a cellular device and/or 802.11-based device.

In operation, as the processing system 200 initializes so as to perform some number of assigned tasks, the processor 210 can transfer any appropriate software program from the data/program storage memory 240 into the data/program memory 220, and similarly transfer any appropriate data to the data/program memory 220. Subsequent to initialization, the processing system 200 may receive a software upgrade file from an external device, such as the software program source device 110 of FIG. 1. Thereafter the processing system 200 may perform any number of software upgrades and downgrades consistent with description below with respect to FIGS. 3-7.

Figure 3:
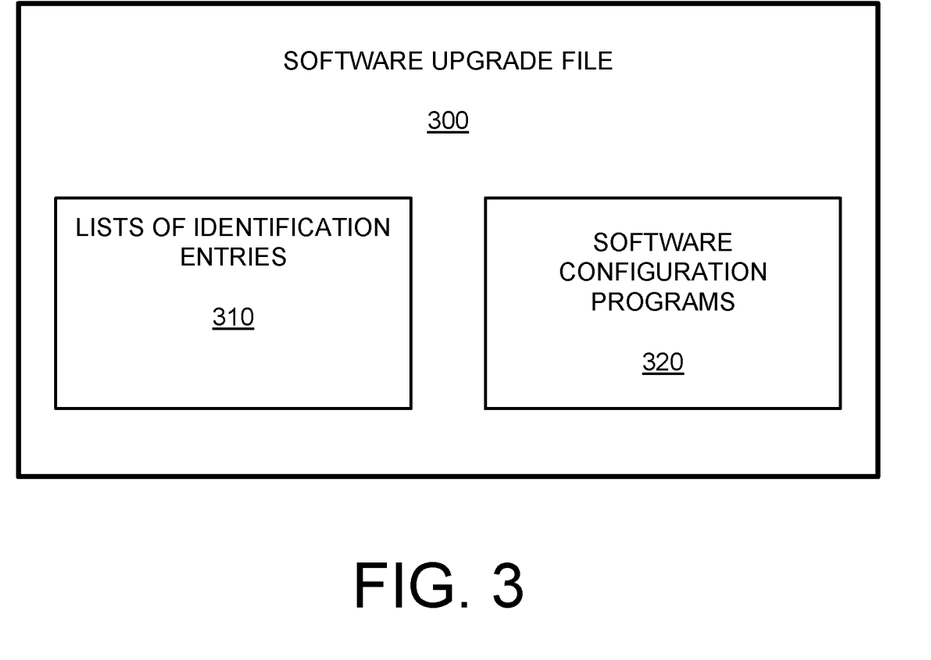
FIG. 3 depicts an example software upgrade file in accordance with one or more examples of the present disclosure.

FIG. 3 depicts an example software upgrade file 300 in accordance with one or more examples of the present disclosure. As shown in FIG. 3, the example software upgrade file 300 includes lists of identification entries 310 and respective software configuration programs 320. As is discussed above, each of the configuration programs 320 may contain any number of instructions in the form of scripts, executable files, pointers to scripts or executable files, or any other type of information that may be used to provide instructions usable to implement a software program upgrade. Further, an identification entry may refer to any form of identifier (e.g., literal name, pointer, etc.) capable of referring to a respective configuration program.

Figure 4:
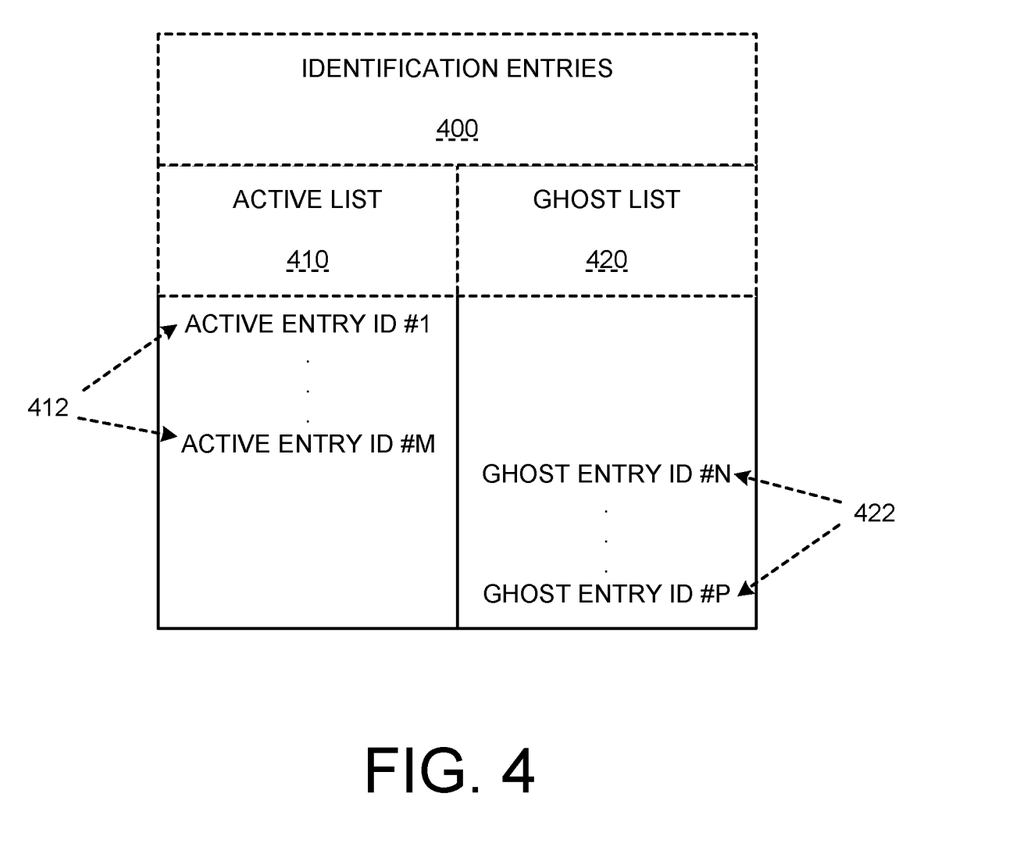
FIG. 4 depicts an example of an identification entry list in accordance with one or more examples of the present disclosure.

The structure of the example lists of identification entries 310 is shown in FIG. 4, which depicts an example of identification entries 400 in accordance with one or more examples of the present disclosure. As is shown in FIG. 4, the identification entries 400 includes an active list 410 of "active" identification entries 412 (labeled ACTIVE ENTRY #1 to ACTIVE ENTRY #M), and further includes a ghost list 420 of "ghost" identification entries 422 (labeled GHOST ENTRY ID #N to GHOST ENTRY #P).

Each active identification entry 412 refers to a respective software configuration program. In the present example of FIG. 4, each active identification entry 412 also constitutes an identifier that can cause a computer-based system, such as the processing system 200 of FIG. 2, to upgrade the software program based on the instructions embedded in the respective software configuration program. However, it is also to be appreciated that active identification entries may be applicable for software program downgrades.

In comparison to active identification entries 412, ghost identification entries 422 do not necessarily have a respective software configuration program, or in the alternative any respective software configuration program for a ghost identification entry 422 is configured to remove previous configuration program related to earlier versions of a software program. Essentially, a ghost identification entry 422 is an identifier that causes a computer-based system to perform at least one of ignoring and removing a respective software configuration program of at least one earlier software version of the software program. Thus, ghost identification entries 422 may effectively "kill" a line of software configuration entries, which is advantageous when a particular feature of a software program is no longer supported. For instance, a ghost identification entry may refer to a software configuration program file (not shown), which when activated removes relevant code from a software program related to an outdated and unused video standard while also removing all previous software configuration programs that actively modified the now outdated and unused video standard. It is to be appreciated that there can be differences between configuration programs that perform upgrade and downgrade, and the configuration program files on which the upgrade/downgrade programs act on. Outdated data in configuration program files, or outdated configuration program files, may be removed by upgrade programs. The ghost entries, on the other hand, should not cause removal of the whole configuration program files. Instead, they cause ignoring of the execution of upgrade/downgrade configuration programs and may optionally cause removal of configuration programs carried by the configuration program files.

Figure 5:
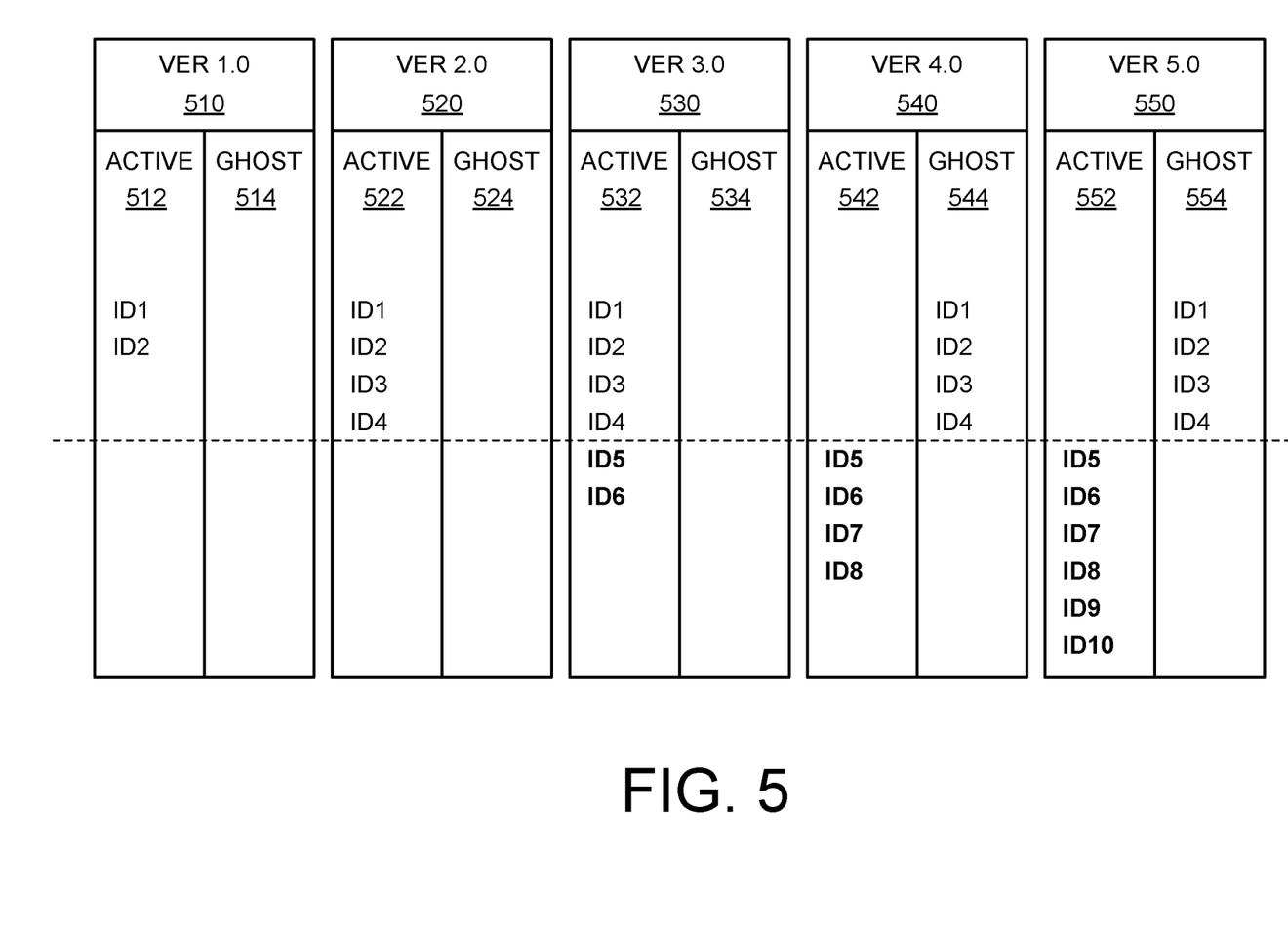
FIG. 5 depicts the relationships of active and ghost identification entries for different software versions of a software program in accordance with some examples of the present disclosure.

FIG. 5 depicts the relationships of active identification entries and ghost identification entries for different software versions of a software program in accordance with the present disclosure. As shown in FIG. 5, five versions of a software program including a first version 510, a second version 520, a third version 530, a fourth version 540, and a fifth 550 are shown. Each version 510-550 includes two lists including: (1) a respective active identification entry list 512, 522, 532, 542, and 552, and (2) a respective ghost identification entry list 514, 524, 534, 544, and 554.

In the early versions 510, 520, and 530 there are no ghost identification entries as may be expected in a new or relatively new software program. However, as is shown in FIG. 5, the fourth version 540 and the fifth version 550 each have a ghost entry list containing four ghost entries ID1, ID2, ID3, and ID4. Accordingly, it is inferred that the features related to ghost entries ID1, ID2, ID3, and ID4 are no longer supported by the fourth version 540, and when an upgrade to the fourth version 540 or the fifth version 550 occurs: (1) the appropriate code in the relevant software program related to ghost identification entries ID1, ID2, ID3, and ID4 may be effectively removed from the relevant software program, and/or (2) each ghost identification entry ID1, ID2, ID3, and ID4 may cause a computer-based system to perform at least one of ignoring and removing a respective software configuration program of at least one earlier software version 510, 520, and 530 of the software program. By "effectively removed" it is to be appreciated that software code often cannot be removed from a software program once the software program is released. However, it is possible to ignore the execution of software code or bypass the software code. On the other hand, in a circumstance where software code is copied from a configuration program into a software program, such software code may be actually removed.

In contrast to the upgrade process, it is to be appreciated the use of ghost entries may change the way a downgrade is performed given that the relevant software support provided by the "ghosted" configuration programs is removed. While downgrading from the fifth version 550 to the fourth version 540, or downgrading from the third version 530 to the second version 520, may present no new downgrade issues, downgrading from the fifth version 550 or the fourth version 540 to the third version 530 will involve a different approach whereby some default software version (in this example the first version 510) is installed where after subsequent upgrades are performed. Additional discussion of downgrading is discussed below with respect to FIG. 7 below.

Figure 6:
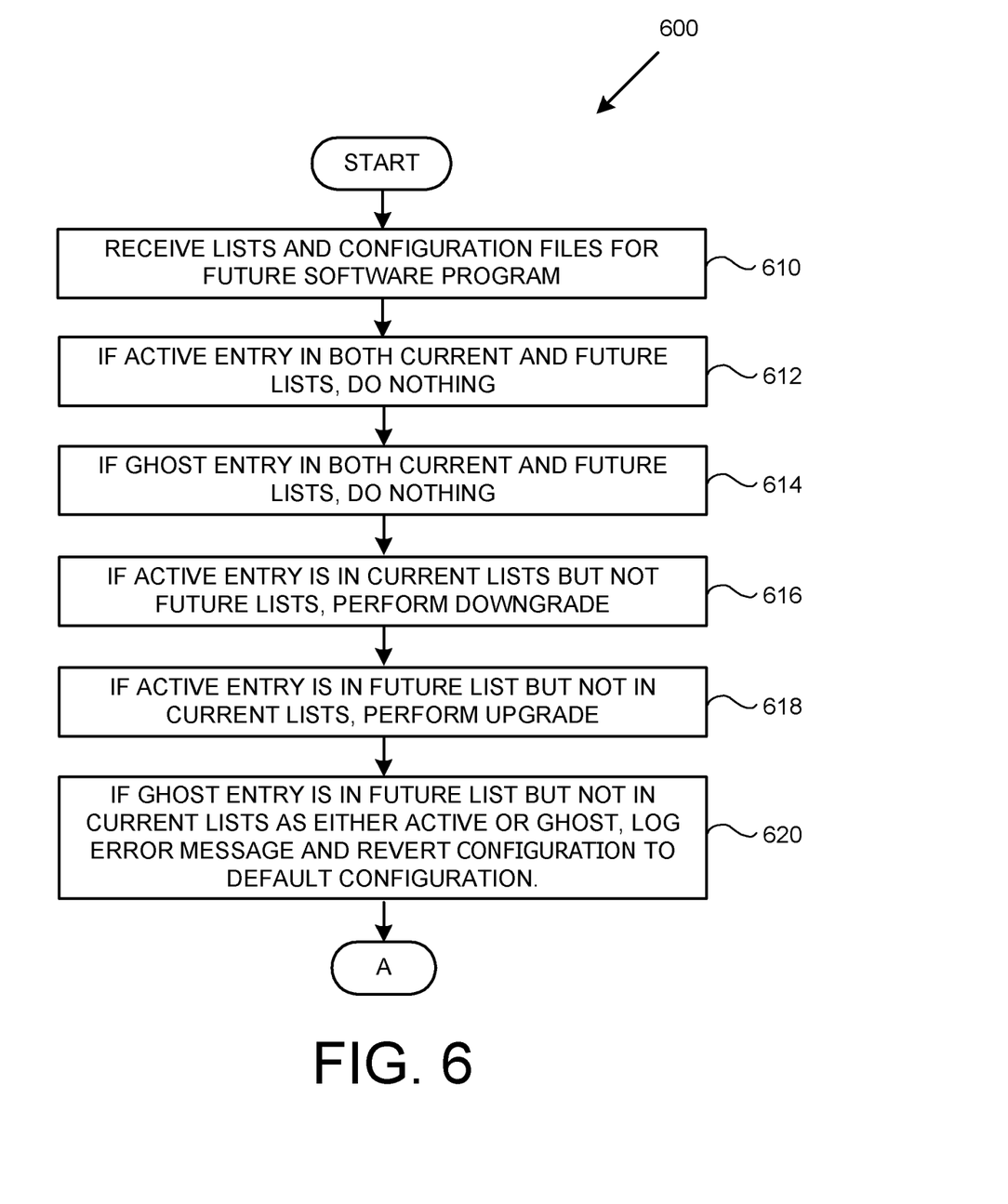
FIG. 6 is a flowchart depicting a method for software upgrade in accordance with one or more examples of the present disclosure.

FIG. 6 is a flowchart depicting a method 600 for software upgrade in accordance with one or more examples of the present disclosure. It is to be appreciated to those skilled in the art in light of this disclosure that, while the various operations 610-614 of FIG. 6 are shown according to a particular order for ease of explanation, that certain operations may be performed in different orders or performed in a parallel fashion. Additionally, certain operations may be omitted in some examples.

The method 600 starts in operation 610 where a processing device or system, such as the processing system 200 of FIG. 2, receives a configuration program file containing: (1) software upgrade or downgrade lists used for upgrading or downgrading a software program from a first version to a second version; and (2) a configuration program file for each entry of the software upgrade or downgrade lists. For the purpose of this disclosure, the first and second versions may refer to an earlier software version and a later software version. However, it is to be appreciated that the particular release time may not be at issue. For example, version 5.3 of a hypothetical software program may not be newer than version 4.6 of the same hypothetical program. The software versions are just different. Thus, when a processing system is instructed to perform a software version change, the disclosed methods and systems will address the appropriate active entries and ghost entries one by one to determine the action for each of for example, upgrading a software program, downgrading a software program, ignoring specific program code, and/or removing a corresponding upgrade/downgrade program. As discussed above a software upgrade file may include: (1) a list of one or more ghost identification entries, (2) a list of one or more active identification entries, and (3) one or more respective software configuration programs for the one or more ghost identification entries and active identification entries.

It is to be appreciated that, in a practical use scenario for upgrading and/or downgrading, there are two lists of active entries and two lists of ghost entries. One set of active and ghost lists relates to a software version currently being used in a processing system, which is herein referred to as the "current list." The other set of active and ghost lists relates to the software program that the processing system will execute in the future and which will trigger software upgrading or downgrading, which is herein referred to as the "future lists." Thus, upgrading and downgrading use a comparison of the current and future lists to determine the action for each entry as is described below.

In operation 612, a comparison is made to determine whether a particular active entry is present in both the current and future lists. If the particular active entry is present in both lists, then no software modification is made. By way of example using the lists of FIG. 5, if a software revision is made from Ver 3.0 to Ver 4.0, there will be no software changes related to entries ID5 and ID6 as both active IDs in Ver 3.0 exist in Ver 4.0.

In operation 614, a comparison is made to determine whether a particular ghost entry exists in both the current and future lists. If the particular ghost entry is present in both the current and future lists, then no software modification is made. Again, by way of example using the lists of FIG. 5, if a software revision is made from Ver 4.0 (current list) to Ver 5.0 (future list), there will be no software changes related to entries ID1~ID4.

In operation 616, a comparison is made to determine whether a particular active entry exists in the current lists, but not in the future lists. If the particular active entry is present in the current lists but not in the future lists, then software modifications (downgrades) are performed for the appropriate IDs according to the instruction located in the respective configuration program file(s). Again, by way of example using the lists of FIG. 5, if a software revision is be performed from Ver 4.0 (current list) to Ver 3.0 (future list), then downgrades related to entries ID7 and ID8 are performed.

In operation 618, a comparison is made to determine whether a particular active entry exists in the future lists, but not in the current lists. If the particular active entry is present in the future lists but not in the current lists, then software modifications (upgrades) are performed according to the instruction located in the respective configuration program file(s). Again, by way of example using the lists of FIG. 5, if a software revision be performed from Ver 4.0 (current list) to Ver 5.0 (future list), then upgrades related to entries ID9 and ID10 are performed.

In operation 620, a comparison is made to determine whether a particular ghost entry exists in the future lists, but not in current lists as either active or ghost. If the particular ghost entry is present in the future lists but not in the current lists as either active or ghost, then some form of log error message may be passed to a user, and the software configuration may revert to a default configuration. Again, by way of example using the lists of FIG. 5, if a software revision be performed from Ver 1.0 (current list) to Ver 4.0 (future list), then some form of log error message may be passed to a user, and the software configuration may revert to a default configuration based on entries ID3 and ID4. Since the configuration of Ver 1.0 was never applied the upgrade of ID3~ID4, and now the configuration upgrade/downgrade for ID3~ID4 is not supported by Ver 4.0. The old configuration most likely is updated and does not work, but the software does not have knowledge about the upgrade/downgrade (the related conversion programs not present, only the IDs are left in). Accordingly, the software may be configured to choose to log an error message about a possible malfunction and/or take some best effort conversion such as converting the configuration to the default configuration.

Figure 7:
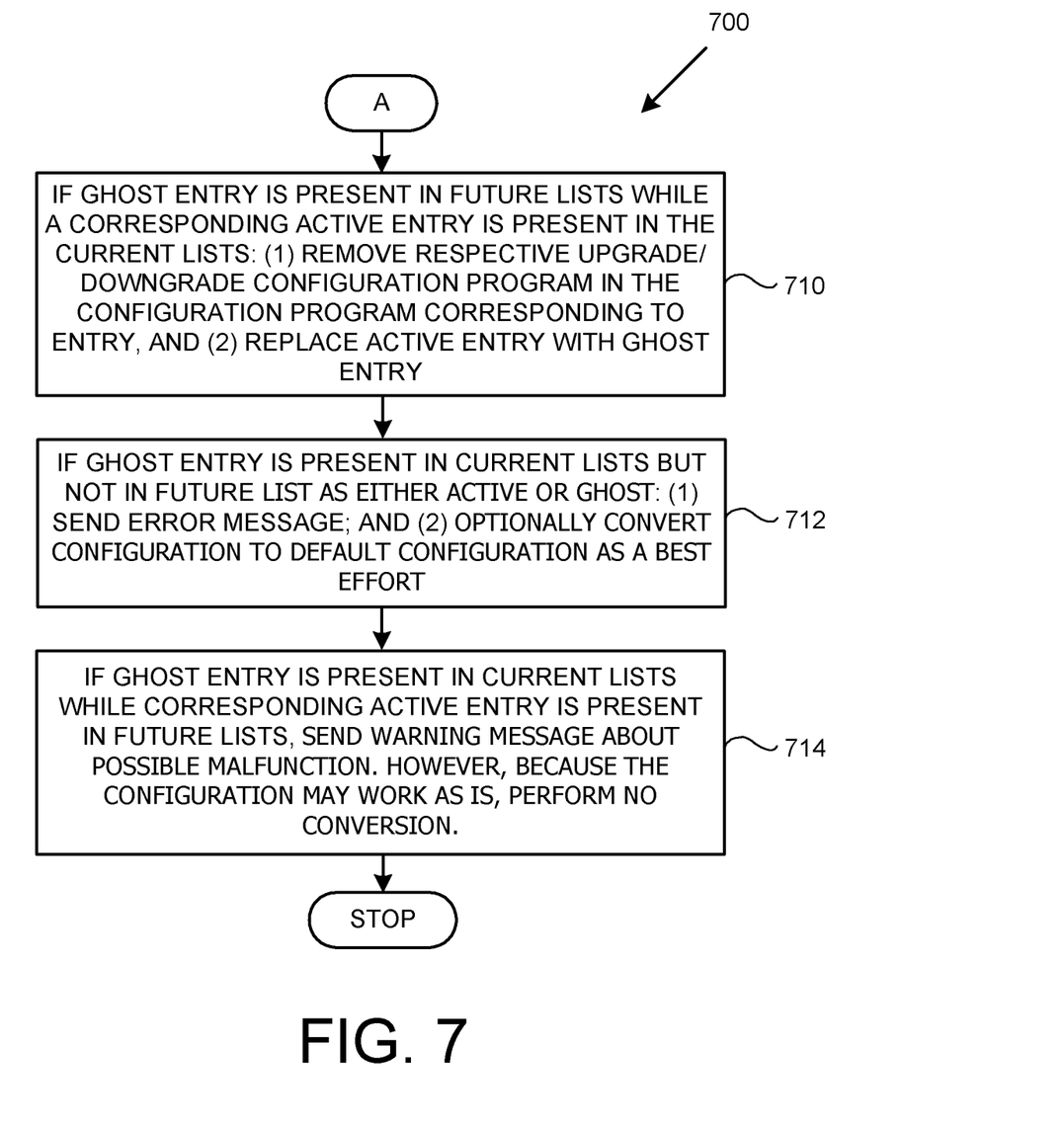
FIG. 7 is a flowchart depicting a method for software downgrade in accordance with one or more examples of the present disclosure.

In operation 710, a comparison is made to determine whether a particular ghost entry exists in the future lists while a corresponding active entry exists in the current lists. If the particular ghost entry is present in the future lists while a corresponding active entry exists but not in the current lists (matching an upgrade path where a configuration upgrade ID is going out of its support window): (1) the respective upgrade/downgrade program in the configuration program file corresponding to that entry is removed, and (2) the active entry is made a ghost entry. Example using the lists of FIG. 5 can be a software revision from Ver 2.0 to Ver 4.0 with regard to ID1~ID4.

In operation 712, a comparison is made to determine whether a particular ghost entry exists in the current lists while a corresponding ghost or active entry does not exists in the future lists. If the particular ghost entry exists in the current lists while a corresponding ghost or active entry does not exists in the future lists: (1) an error message is provided to a user, (2) a software option may choose to revert system configuration to a default configuration, and (3) software upgrades and downgrades are not performed. This case matches an example using the lists of FIG. 5 in view of: (A) the processing of ID3 and ID4 when a software revision is performed from Ver 4.0 (current list) to Ver 1.0 (future list); and (B) upgrade/downgrade programs of ID3 and ID4 have been out of support window but a user wants to load a much older version where the upgrade/downgrade program does not exist (not yet developed). Besides logging error message, software may (optionally) choose to revert the corresponding configuration back to default configuration, because the existing configuration most likely were applied upgrade conversion before and would not work with the old software version, but the software does not have knowledge about the upgrade that was done, so no upgrade/downgrade may be done.

In operation 714, a comparison is made to determine whether a particular ghost entry exists in the current lists while a corresponding active entry exists in the future lists. If the particular ghost entry exists in the current lists while a corresponding active entry exists in the future lists: (1) an warning message is provided to a user for possible malfunction, and (2) no software upgrade or downgrade needs to be performed. This case matches an example using the lists of FIG. 5 for the processing of ID1~ID4 when a software revision is performed from Ver 4.0 (current list) to Ver 2.0 (future list). This represents a system downgrade from a version where some configuration upgrade/downgrade is out of a support window back to a version where the upgrade/downgrade is still supported. The existing configuration should have received appropriate upgrade/downgrade before the support was expired, and now it is back to a version where the upgrade/downgrade is still supported. The configuration may still work as is, but that is not guaranteed, and software should log a warning message for possible malfunction. The method 700 then stops.

Figure 8:
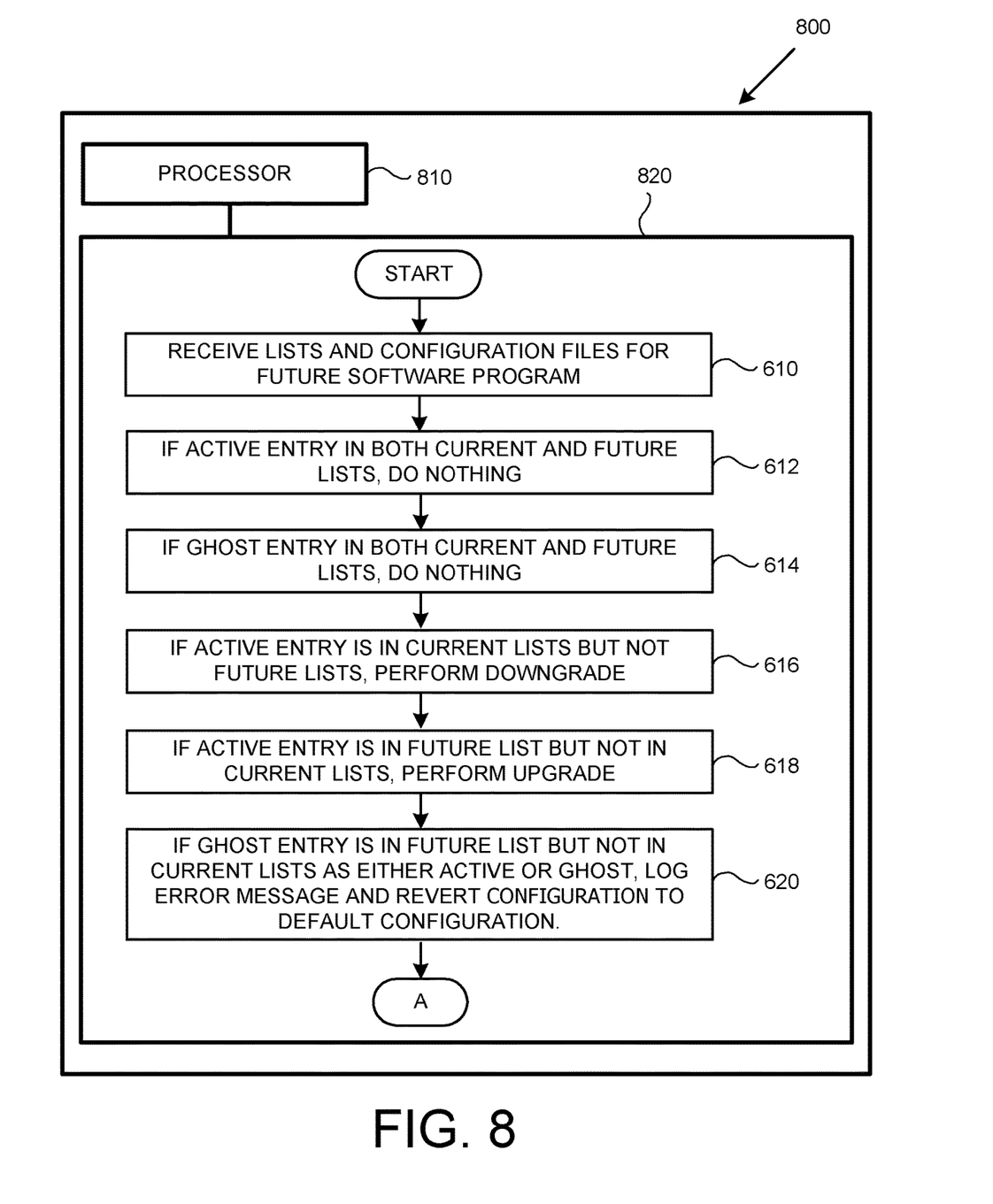
FIG. 8 depicts a computing device including a processor communicatively connected to a storage device containing instructions for performing a software upgrade in accordance with one or more examples of the present disclosure.

FIG. 8 depicts a processing system 800 that includes a processor 810 communicatively connected to a computer program product/storage device 820 containing instructions for performing a software upgrade in accordance with one or more examples of the present disclosure. The computer program product/storage device 820 of FIG. 8 is a non-transient computer-readable storage memory containing the plurality of instructions of FIG. 6 such that, when operated upon by a processing system that includes the processor 810 and a memory communicatively coupled to the processor 810, causes the processor 810 to perform a number of operations consistent with the flowchart of FIG. 6. Because the operations of FIG. 6 have already been described in detail, such operations need not be repeated as an issue of brevity.

Figure 9:
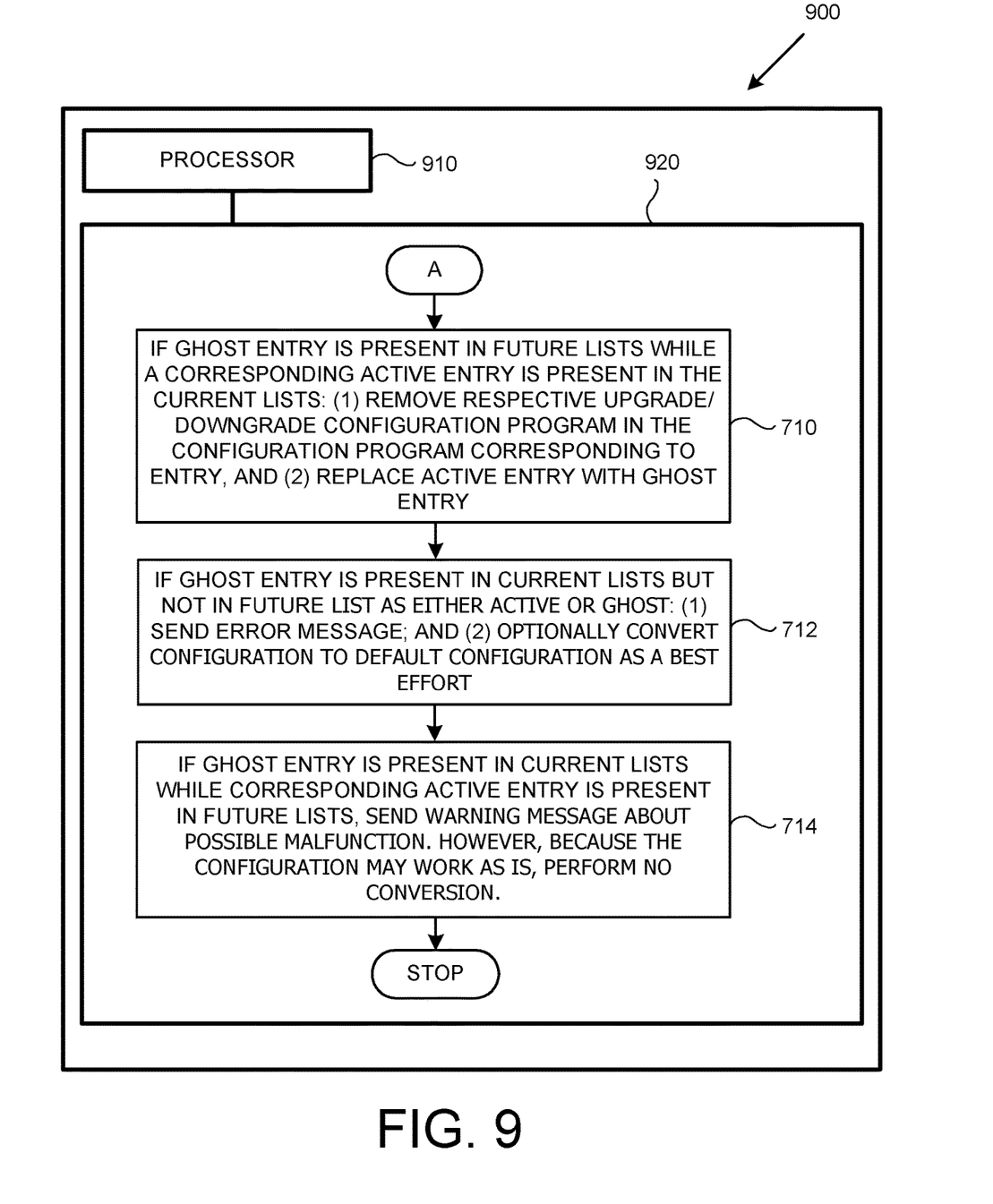
FIG. 9 depicts a computing device including a processor communicatively connected to a storage device containing instructions for performing a software downgrade in accordance with one or more examples of the present disclosure.

FIG. 9 depicts a computing device including a processor 910 communicatively connected to a storage device 920 containing instructions for performing a software downgrade in accordance with one or more examples of the present disclosure. As with the computer program product/storage device 820 of FIG. 8, the computer program product/storage device 920 of FIG. 9 is a non-transient computer-readable storage memory containing the plurality of instructions of FIG. 7 such that, when operated upon by a processing system that includes the processor 910 and a memory communicatively coupled to the processor 910, causes the processor 910 to perform a number of operations consistent with the flowchart of FIG. 7. Because the operations of FIG. 7 have already been described in detail, such operations need not be repeated as an issue of brevity.

In various examples the above-described systems and/or methods may be implemented using any form of known or later-developed circuitry (e.g., electronic, optical) or programmable device, such as a computer-based system or programmable logic. It should be appreciated that the above-described systems and methods can be implemented using any of various known or later developed programming/scripting languages, such as "Pert," "Object Pascal," "Pascal" "SQL," "C," "C++," "FORTRAN," "Python," "VHDL" and the like.

Accordingly, various storage media, such as magnetic computer disks, optical disks, electronic memories or any other form of non-transient computer-readable storage memory, can be prepared that can contain information and instructions that can direct a device, such as a computer, to implement the above-described systems and/or methods. Such storage devices can be referred to as "computer program products" for practical purposes. Once an appropriate device has access to the information and programs contained on the storage media/computer program product, the storage media can provide the information and programs to the device, thus enabling the device to perform the above-described systems and/or methods. Unless otherwise expressly stated, "storage medium" is not an electromagnetic wave per se.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to database-related services.

While the methods and systems above are described in conjunction with specific examples, it is evident that many alternatives, modifications, and variations will be apparent to those skilled in the art. Accordingly, the examples above as set forth herein are intended to be illustrative, not limiting. There are changes that may be made without departing from the scope of the present disclosure.

What is claimed is:

1. A method to modify a software program, comprising:
    extracting, from a configuration program file, a future list of one or more future active entries relating to a future version of the software program;
    extracting, from the configuration program file, a future list of one or more future ghost entries relating to the future version of the software program;
    comparing the lists of one or more future active entries and one or more future ghost entries to a current list of one or more current active entries and a current list of one or more current ghost entries of a current version of the software program; and
    performing at least one upgrade or at least one downgrade of the current version of the software program in response to at least one comparison of the current and future lists so as to produce the future version of the software program.

2. The method of claim 1, further comprising performing at least one removal of upgrade/downgrade configuration program in response to at least one comparison of the current and future lists so as to produce a future version of the software program.

3. The method of claim 1, wherein comparing the future lists of active and ghost entries to the current lists of active and ghost entries includes determining whether a first current active entry exists but no respective future active or ghost entry exists.

4. The method of claim 3, comprising performing a software downgrade to the current version of the software program in response to a determination that the first current active entry exists but no respective future active or ghost entry exists.

5. The method of claim 2, wherein comparing the future lists of active and ghost entries to the current lists of active and ghost entries includes determining whether a second future active entry exists but no respective current active or ghost entry exists.

6. The method of claim 5, comprising performing a software upgrade to the current version of the software program in response to a determination that the second future active entry exists but no respective current active or ghost entry exists.

7. The method of claim 4, further comprising performing no software modification in response to a situation where both a first current active entry exists and a respective future active entry exists.

8. The method of claim 4, further comprising performing no software modification in response to a situation where both a first current ghost entry exists and a respective future ghost entry exists.

9. The method of claim 6, further comprising logging and error message and reverting the software configuration to default setting in response to at least one of:
    a situation where a first future ghost entry exists but no respective current active or ghost entry exists; and
    a situation where a first current ghost entry exists but no respective future active or ghost entry exists.

10. The method of claim 9, further comprising performing no software modification in response to any of:
    a situation where both a first current active entry exists and a respective future active entry exists; or
    a situation where both a first current ghost entry exists and a respective future ghost entry exists.

11. The method of claim 2, wherein comparing the future lists of active and ghost entries to the current lists of active and ghost entries further includes determining whether a third ghost entry is present in the future ghost entry list while a respective active entry exist in the current active entry list.

12. The method of claim 11, further comprising removing an upgrade/downgrade program from the configuration program file in response to the third ghost entry being present in the future ghost entry list while the respective active entry exist in the current active entry list.

13. The method of claim 2, wherein comparing the future lists of active and ghost entries to the current lists of active and ghost entries further includes determining whether a third ghost entry is present in the current ghost entry list while a respective active entry exist in the future active entry list.

14. The method of claim 13, further comprising providing a warning to a user in response to the third ghost entry being present in the current ghost entry list while the respective active entry exist in the future active entry list.

15. The method of claim 14, further comprising logging an error message, and converting a software configuration to default settings downloading a default software version of the software in response to the third ghost entry being present in the current ghost entry list while no respective active or ghost entry exist in the future entry lists.

16. A processing system for modifying a software program, comprising:
a processor; and
memory communicatively coupled to the processor, the memory containing a set of instructions that cause the processor to:
extract, from a configuration program file, a future list of one or more future active entries relating to a future version of the software program;
extract, from the configuration program file, a future list of one or more future ghost entries relating to the future version of the software program;
compare the lists of one or more future active entries and one or more future ghost entries to a current list of one or more current active entries and a current list of one or more current ghost entries of a current version of the software program; and
perform at least one upgrade or at least one downgrade of the current version of the software program in response to at least one comparison of the current and future lists so as to produce the future version of the software program.

17. The processing system of claim 16, wherein performing at least one upgrade or at least one downgrade comprises performing a software upgrade to the current version of the software program in response to a determination that a first future active entry exists but no respective current active or ghost entry exists.

18. The processing system of claim 16, further comprising performing a software downgrade to the current version of the software program in response to a determination that a second current active entry exists but no respective future active or ghost entry exists.

19. A computer program product, comprising:
a non-transitory computer-readable storage memory containing a plurality of instructions such that, when operated upon by a processing system that includes a processor and a memory communicatively coupled to the processor, causes the processor to:
extract, from a configuration program file, a future list of one or more future active entries relating to a future version of the software program;
extract, from the configuration program file, a future list of one or more future ghost entries relating to the future version of the software program;
compare the lists of one or more future active entries and one or more future ghost entries to a current list of one or more current active entries and a current list of one or more current ghost entries of a current version of the software program;
perform at least one upgrade or at least one downgrade of the current version of the software program in response to at least one comparison of the current and future lists so as to produce the future version of the software program; and
perform at least one removal of an upgrade/downgrade configuration program in response to at least one comparison of the current and future lists so as to produce the future version of the software program.

20. The program product of claim 19, wherein the plurality of instructions contained on the non-transitory computer-readable storage memory when operated upon by the processing system cause the processor to:
perform a software upgrade to the current version of the software program in response to a determination that a first future active entry exists but no respective current active or ghost entry exists; or
perform a software downgrade to the current version of the software program in response to a determination that a second current active entry exists but no respective future active or ghost entry exists.

\* \* \* \* \*